(12) United States Patent
Berry et al.

(10) Patent No.: US 6,230,646 B1
(45) Date of Patent: May 15, 2001

(54) DEEP OCEAN, MID-WATER FARMING APPARATUS

(76) Inventors: Michael Berry, 1820 S. El Camino Real, A-202, Encinitas, CA (US) 92023; Jeremy Johnson, 230 Calle Cuervo, San Clemente, CA (US) 92672

( * ) Notice: Subject to any disclaimer, the term of this patent is extended or adjusted under 35 U.S.C. 154(b) by 0 days.

(21) Appl. No.: 09/444,752

(22) Filed: Nov. 22, 1999

(51) Int. Cl.[7] .................................................. B63B 21/24
(52) U.S. Cl. ........................ 114/293; 114/294; 114/311; 119/207; 119/208; 119/204; 119/234; 119/238; 119/239
(58) Field of Search ............................. 114/52, 293, 294, 114/299, 311; 119/207, 208, 215, 223, 239, 240, 200, 204, 221, 224, 234, 238

(56) References Cited

U.S. PATENT DOCUMENTS

| | | | | |
|---|---|---|---|---|
| 1,815,521 | * | 7/1931 | Miyagi | 119/238 |
| 2,989,945 | * | 6/1961 | Ford | 119/240 |
| 3,675,626 | * | 7/1972 | Down | 119/238 |
| 4,395,970 | * | 8/1983 | Kunkle et al. | 119/240 |
| 4,441,453 | * | 4/1984 | McMickle et al. | 119/221 |
| 4,744,331 | * | 5/1988 | Whiffin | 119/223 |
| 4,766,846 | * | 8/1988 | Lavoie | 119/240 |
| 4,872,782 | * | 10/1989 | Streichenberger | 119/238 |
| 5,309,672 | * | 5/1994 | Spencer et al. | 119/208 |

* cited by examiner

*Primary Examiner*—S. Joseph Morano
*Assistant Examiner*—Lars A. Olson
(74) *Attorney, Agent, or Firm*—John J. Murphey

(57) ABSTRACT

A deep ocean, mid-water farming apparatus, for propagating bi-valves, kelp and sea weed comprising a plurality of air-containing tanks arranged in a frame and including a lower frame element and an upper frame element, a device for anchoring the tanks in deep water and including connectors to connect the anchor to the lower frame element for holding the device in deep water, a plurality of upwardly directed elongated tubular substrates, on which to grow the bi-valves, the substrates arranged about a vertically-oriented center strut, each substrate defined by a first, lower terminal end, for connection to the upper frame element, and a second, upper terminal end, spaced-apart from the first end and, a top hat centered about the strut for connecting to the upper ends of the tubular substrates for holding them in a fixed configuration thereabout.

18 Claims, 4 Drawing Sheets

DEEP OCEAN, MID-WATER FARMING APPARATUS

BACKGROUND OF THE INVENTION

1. Field of the Invention

This invention pertains to the field of habitation and propagation of coastal and pelagic fish species and sea flora. More particular, it pertains to a novel farming apparatus for use in deep ocean, away from land, ocean vessels and other potentially damaging forces on which to grow bi-valves and kelp.

2. Description of the Prior Art

Coastal and pelagic fish and flora are under constant attack from man and his forces. Sewage pollution is a fact in virtually every part of every coastline in all parts of the world from Antarctica to the North Pole and in all ports of call. Oil and other materials spilled, leaked or dumped from ocean-going vessels and dropped from airplanes has caused deterioration of virtually all sea life including kelp and other ocean-grown plants. If that were not enough, over-fishing, poaching, and miles-long gill netting have reduced many species of fish to near-extinct level. What few attempts at supporting sea life has been timid at best and appears not to be able to undue what has and still is being done to the sea.

As to bi-valve populations, some effort has and is being made to provide support structures in small bays, harbors and inlets on which to grow clams, oysters, and other such animals. Most of this work is plagued by pollution of the water by those living and working nearby these facilities. Some other efforts have been made to raise kelp and other such marine plant life in special holding pens for later replanting in the ocean, however, there is not much incentive to spend funds to raise such crops.

Virtually all such rehabilitation efforts has been confined to shore facilities because of such obvious factors: ease of access to the facilities by road; less expensive land-based structural facilities rather than floating facilities; and, easier access to a useable workforce. Other factors, such as ship traffic and adverse weather patterns, further prompt development of sea life repair facilities away from the open water.

SUMMARY OF THE INVENTION

This invention is a mid-water ocean subsurface substrate which is designed to grow stationary marine bi-valves and kelp. The structure is also intended to provide an environment for the habitation and propagation of coastal and pelagic fish species. It is a deep ocean, mid-water marine fanning concept and is anchored to the ocean floor and suspended no less than in 80 feet or so of sea water at low tide. Thus, it lies below the ship traffic and also cannot be seen by those on the surface. While it is accessible from the surface of the ocean, it will lie off-shore a sufficient distance to discourage pilferage and poaching. It is designed to lie off the 3-mile coastal zone limit in waters 100 feet or greater. It is moored in place mid-water at least 80 feet below the ocean surface at low tide using buoyancy tanks rather than being a fixed structure on the ocean bottom or suspended from the surface. The key to the invention is that it is a bottom-up design and not a top-down design suspended by surface floats. It is thus removed from the greatest threat of pollution from shore and is not a threat to vessel navigation.

The invention is a deep ocean, mid-water farming apparatus, for propagating and purging bi-valves and ocean plants including kelp and seaweed, comprising a plurality of air-containing tanks arranged in a frame and including a lower frame element and an upper frame element, a device for anchoring the tanks in deep water and including connectors to connect the anchor to the lower frame element for holding the device in deep water, a plurality of upwardly directed elongated tubular substrates, on which to grow the bi-valves, the substrates arranged about a vertically-oriented center strut, each substrate defined by a first, lower terminal end, for connection to the upper frame element, and a second, upper terminal end, spaced-apart from the first end and, a top hat centered about the strut for connecting to the upper ends of the tubular substrates for holding them in a fixed configuration thereabout.

Accordingly, the main object of the invention a means of raising ocean bi-valves and kelp in a controlled environment that lends itself to efficient operation and high growth rates. Other objects of this invention include a means to promote new growth of marine life using simple, ruggedly designed structures that are positioned in deep ocean, below ship traffic and outside most areas of pollution; a means of promoting bi-valve growth that is easily harvested and made available for regrowth; a means of promoting kelp production that is also easily harvested and made available for re-use; and, a structure that is easily manufactured, from low-cost materials, easily positioned in the desired area and easily attended.

These and other objects of the invention will become more clear when one reads the following specification, taken together with the drawings that are attached hereto. The scope of protection sought by the inventor may be gleaned from a fair reading of the claims that conclude this specification.

DESCRIPTION OF THE PREFERRED EMBODIMENT

Figure 1:
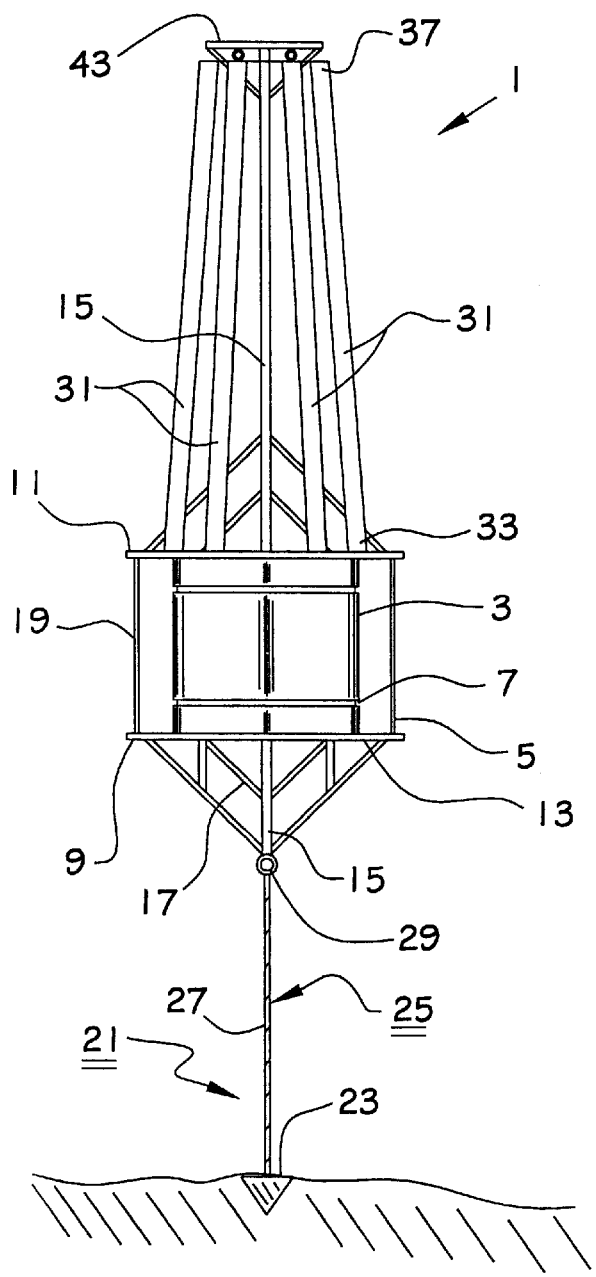
FIG. 1 is a side view of one of the preferred embodiments of the invention for growing bi-valves.
Figure 2:
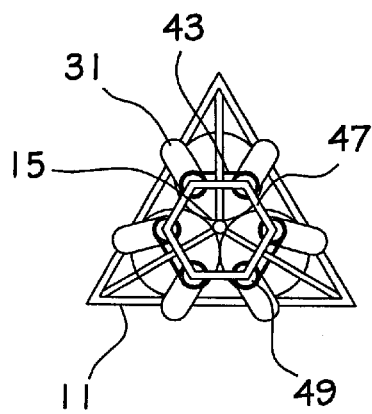
FIG. 2 is a top view of the embodiment shown in FIG. 1.

Turning now to the drawings wherein elements are identified by numbers and like elements are identified by like numbers throughout the nine figures, the invention 1 is depicted in FIG. 1 as a deep ocean, mid-water farming apparatus, for propagating bi-valves, and shows a plurality of air-containing tanks 3, such as 55-gallon plastic drums, arranged in a frame 5, preferably tied together at 7, in right geometric configuration such as in triangular fashion as shown in FIG. 2. Drums are confined in a frame 5 that includes a lower frame element 9 and an upper frame element 11. Frame elements 9 and 11 are preferably made of metal tubing, such as 0.0625 square stainless-steel tubing, for strength and to resist the corrosive action of sea water. Frame elements 9 and 11 each preferably comprise a planar platform 13 made of metal tubing welded together at their intersection points and centered around a vertically-oriented center strut 15 and supported by angled support tubes 17 welded or otherwise attached thereto as shown. Upper frame element 11 and lower frame element 9 are attached together with cables 19 to hold said tanks and said frame together in a tight configuration.

Figure 3:
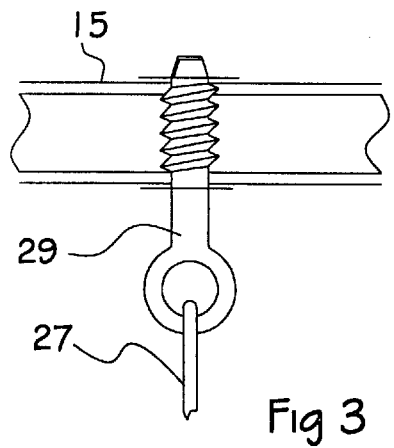
FIG. 3 is a close-up view of the eye-bolt for connecting the frame to the anchor means.

A means 21 is provided for anchoring tanks 3 and frame 5 in deep water. As shown in FIG. 1, any heavy weight 23 may be used as means 21. It is preferred that the weight be at least six (6) tons to prevent tanks 3 from rising to the ocean surface or, more likely, being swept by ocean currents to an unknown location and lost. Also included is connection means 25, to connect anchor means 21 to lower frame element 9, for holding said device in deep water. The preferred type of anchor means is a strong plastic rope 27, such as a high-strength polysynthetic line, to resist the effects of sea water corrosion. Rope 27 is preferably connected to a stainless steel eye-bolt 29 that is bolted to center strut 15 as shown in FIG. 3.

Figure 4:
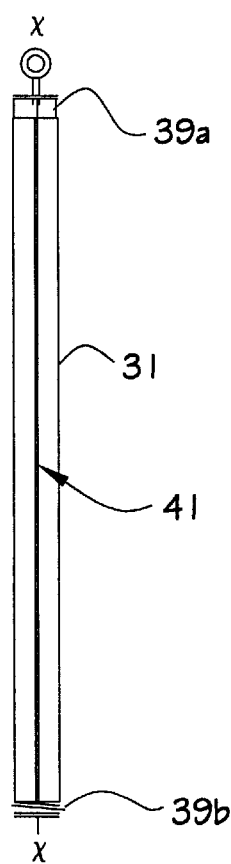
FIG. 4 is a side view, partially in section, of the internal construction of the bi-valve growing substrate of this invention.

As shown in FIGS. 1 and 2, a plurality of upwardly directed elongated tubular substrates 31 are provided, on which to grow the bi-valves. Substrates 31 are preferably six (6) each 10–12 foot-long lengths of Schedule 40, ABS 8-inch nominal-diameter plastic pipe. The pipes are arranged concentrically about vertically-oriented center strut 15, each pipe defined by a first, lower terminal end 33, for connection to upper frame element 9, and a second, upper terminal end 37, spaced-apart from first end 33. It is preferred that each pipe 31 is capped at each said terminal end by plugs 39a and 39b, as shown in FIG. 4. The plugs are interconnected along of the center line axis x—x inside pipe 31 by a cable 41 to place the pipes under compressive stress and thus make them more resistant to damage from being bumped by other elements of invention 1.

A top hat connector 43 is shown in FIG. 2, centered about vertically oriented center strut 15, for connecting to the upper terminal ends 37 of tubular substrates 31 for holding them in a fixed configuration. As shown in FIG. 2, connector 43 comprises six short tubes 47 attached in end-to-end fashion in a hexagonal pattern, wherein each upwardly directed elongated tubular substrates is attached to the junctions 49 between each two said short tubes to hold said six upwardly directed elongated pipes 31 in a hexagonal pattern. Note that pipes 31 are angled inward from their lower terminal ends 33 to their upper terminal ends 37.

Figure 5:
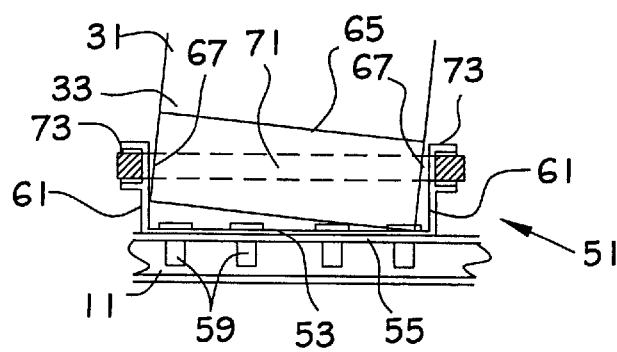
FIG. 5 is a front view of the lower end of the bi-valve growing substrate and of its connection to the upper frame element.
Figure 6:
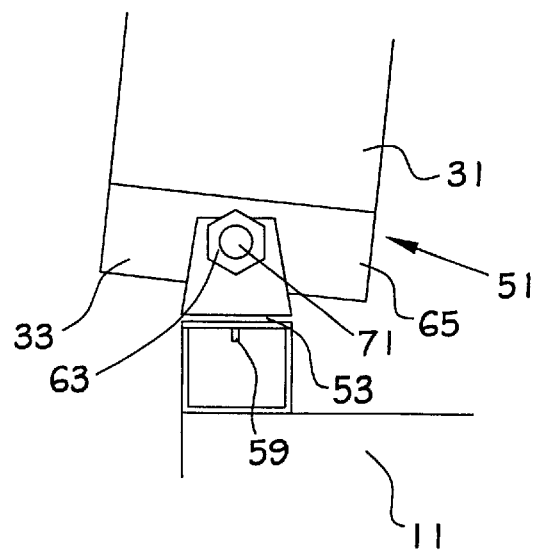
FIG. 6 is a side view of the embodiment shown in FIG. 4.

As shown in FIGS. 5 and 6, the lower terminal ends 33 of elongated tubular substrates 31 are connected to upper frame element 11 by a connector 51. A typical connector 51 is shown as comprising a bracket 53 including a bracket body 55 attached to upper frame element 11 by a plurality of rivets 59. A pair of bracket ends or ears 61 extends upward, in spaced-apart arrangement, from each end of bracket body 55. An aperture 63 is formed through each said ear. A narrow strip 65 of water-resistant metal banded about the exterior of pipe lower end 33 and has formed therethrough a pair of spaced-apart apertures 67 in alignment with bracket end apertures 63. A water-resistant metal dowel 71 is passed through apertures 63 and 67 in banding 65. Dowel 71 has a series of threads formed in the exterior surface at the ends thereof for receipt of nut or other threaded capping means 73. Apertures 63 and 67 can be drilled off-center as shown in FIG. 5 to insure pipe 31 remains at an angle to vertical strut 15.

Figure 7:
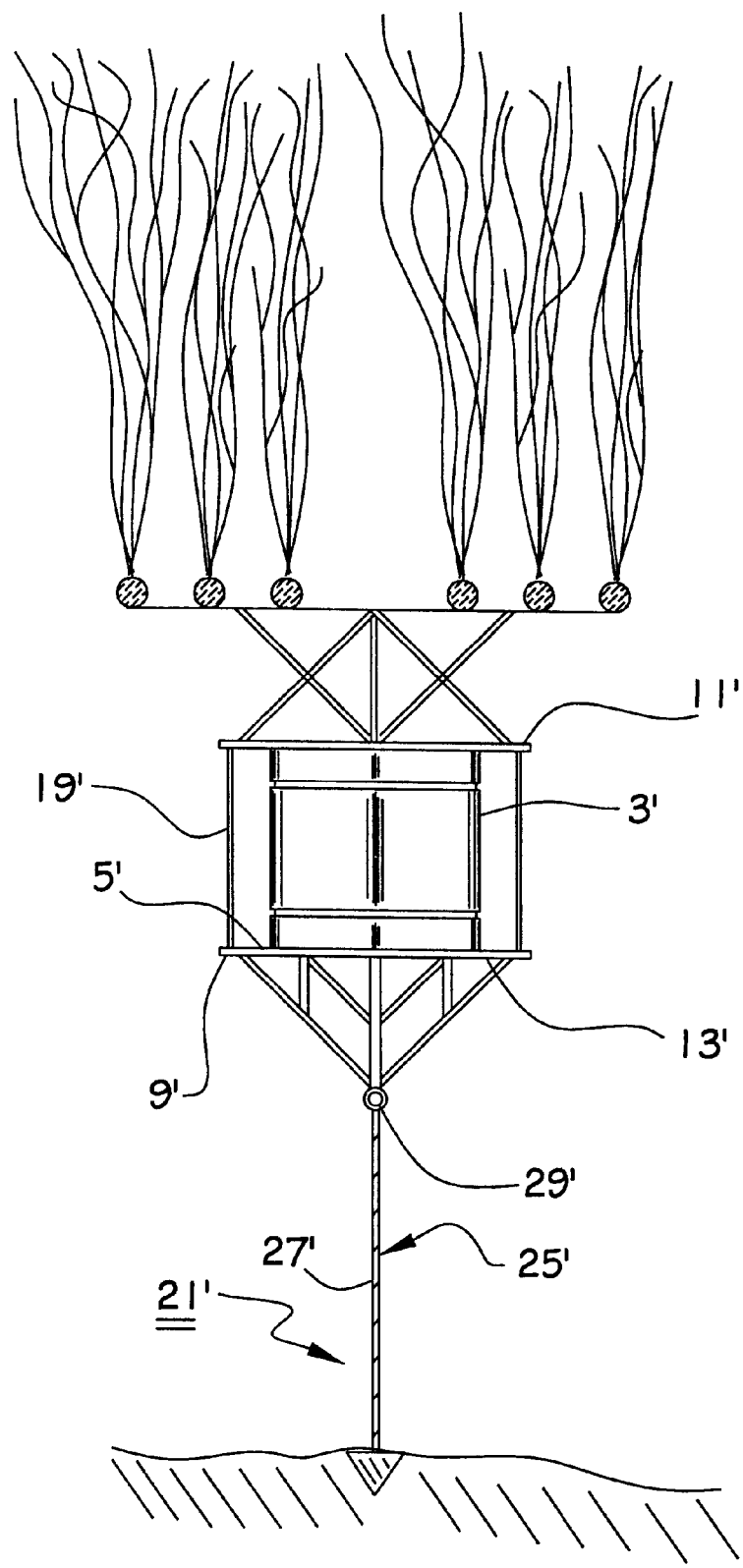
FIG. 7 is a side view of another embodiment of the invention used for growing kelp.

Another embodiment of this invention is shown in FIG. 7 for propagating kelp. At least one air-containing tank 3', such as a 55-gallon plastic drum, is provided and is mounted in a frame 5'. Drum 3' is confined in a frame 5' that includes a lower frame element 9' and an upper frame element 11'. Frame elements 9' and 11' are preferably made of metal tubing, such as 0.0625 square stainless-steel tubing, for strength and to resist the corrosive action of sea water. Frame elements 9' and 11' each preferably comprise a planar platform 13' made of metal tubing welded together at their intersection points. Upper frame element 11' and lower frame element 9' are attached together with cables 19' to hold tank 3' and frame 5' together in a tight configuration.

A means 21' is provided for anchoring tanks 3' and frame 5' in deep water. As shown in FIG. 7, any heavy weight may be used as means 21'. It is preferred that the weight be at least six (6) tons to prevent tank 3' from rising to the ocean surface or, more likely, being swept by ocean currents to an unknown location and lost. Also included is connection means 25', to connect anchor means 21' to lower frame element 7', for holding said device in deep water. It is preferred to use a strong plastic rope 27', such as a high-strength polysynthetic line, to resist the effects of sea water corrosion. Rope 27' is preferably connected to a stainless steel eye-bolt 29' that is bolted to the center of lower frame element 7'.

Figure 8:
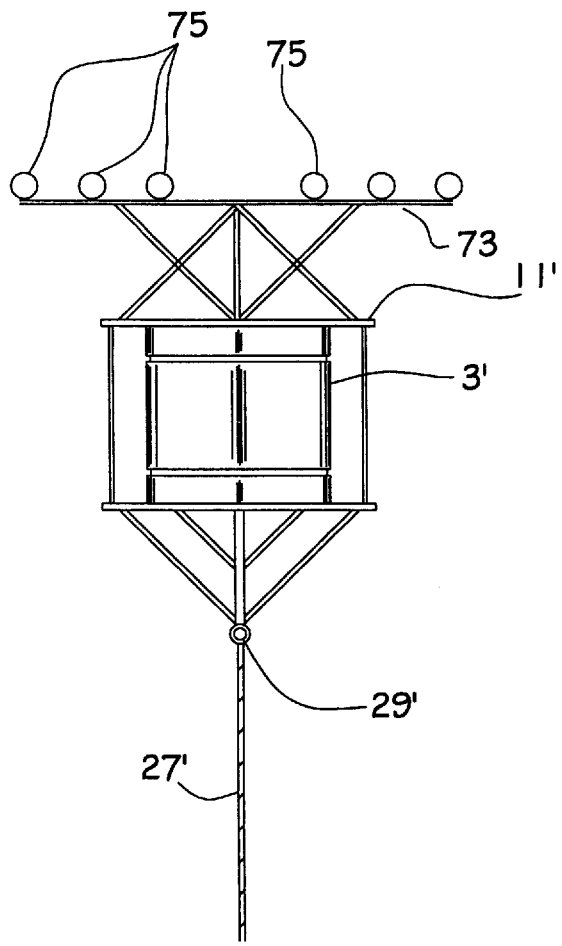
FIG. 8 is another side view of the embodiment shown in FIG. 7 without the kelp having been planted; and, FIG. 9 is a top view of still another embodiment of the kelp-growing invention showing two cross-arms.
Figure 9:
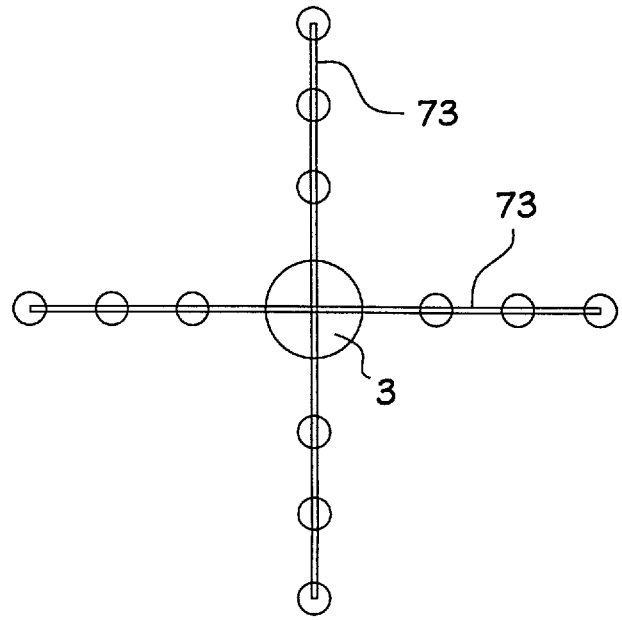

As shown in FIG. 8, at least one cross arm 73 is attached to upper frame element 11', extending outward, preferably horizontally and orthogonal to rope 27', from tank 3'. It is preferred that cross-arm 73 be made strong, such as from a length of Schedule 40, stainless steel 2½ inch nominal diameter pipe. A plurality of kelp-growing substrates 75 are anchored along cross-arn 73, each for receipt of a kelp plant as shown. Kelp-growing substrates may take the form of hollow balls made of polyethylene plastic or the like having a plurality of holes molded therein to anchor the roots of the kelp therein. FIG. 9 shown another embodiment of the invention where there are two cross-arms 73, each arranged orthogonal to each other in planar alignment and orthogonal to anchor connecting rope 27'.

In using the invention to grow bi-valves, it is first sunk in the sea, off the coast and anchored in 100 feet of water and at least 80 feet below the surface. Bi-valve larva are grown on the exterior surface of tubular substrates 31 and allowed to mature undisturbed taking their nourishment from the surrounding sea water. Upon reaching the appropriate size, substrates 31 are disconnected from frame 5 and raised from the sea where they are subject to processing to remove the bi-valves and then repositioned in the sea, on frame 5, to begin a new growth of bi-valves.

When used to grow kelp, small kelp plants are planted in substrate 75 and allowed to grow under water, the same as the bi-valves. The kelp is grown and left on the kelp substrates permanently. Kelp normally grows three to four feet per day, so only the tops at the surface are removed and harvested. The plant itself need not be removed.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A deep ocean, mid-water farming apparatus, for propagating bi-valves, comprising:
   a) a plurality of air-containing tanks arranged in a frame and including a lower frame element and an upper frame element;
   b) means for anchoring said tanks and said frame in deep water and including connection means to connect said anchor means to said lower frame element for holding said device in deep water;
   c) a plurality of upwardly directed elongated tubular substrates, on which to grow the bi-valves, said substrates arranged about a vertically-oriented center strut, each said substrate defined by a first, lower terminal end, for connection to said upper frame element, and a second, upper terminal end, spaced-apart from said first end; and,
   d) a top hat centered about said strut for connecting to said upper ends of said tubular substrates for holding them in a fixed configuration thereabout.

2. The apparatus of claim 1 wherein said air-containing tanks are large plastic drums arranged in a geometric pattern in said frame and concentrically about said center strut.

3. The apparatus of claim 1 wherein said air-containing tanks are large plastic pipe arranged in a geometric pattern in said frame and concentrically about said center strut.

4. The apparatus of claim 1 wherein said air-containing tanks are large plastic 55-gallon drums arranged in a geometric pattern in said frame and said lower frame element is set below said tanks, said upper frame element is set above said tanks, and said frame elements are joined together by cables connected therebetween.

5. The apparatus of claim 1 wherein said air-containing tanks are large plastic piping selected from the group consisting of ABS plastic pipe, PVC plastic pipe, and mixtures thereof arranged in a geometric pattern in said frame and said lower frame element is set below said pipes, said upper frame element is set above said pipes, and said frame elements are joined together by cables connected therebetween.

6. The apparatus of claim 1 wherein said means for anchoring said tanks in deep water include a heavy weight exceeding six tons and said connection means is a high strength synthetic plastic rope.

7. The apparatus of claim 1 wherein said plurality of upwardly directed elongated tubular substrates include Schedule 40, ABS 8-inch nominal diameter plastic pipe.

8. The apparatus of claim 1 wherein said plurality of upwardly directed elongated tubular substrates are six Schedule 40, ABS 8-inch nominal diameter plastic pipes not less than ten feet long and arranged an inwardly angled hexagonal pattern between said lower terminal end and said upper terminal end and about said center strut.

9. The apparatus of claim 6 wherein each said pipe is capped at each said terminal end by a plug and said plugs are interconnected along of the center line axis inside said pipe by a cable.

10. The apparatus of claim 6 wherein said lower terminal end of said elongated tubular substrate is connected to said upper frame element by a connector, said connector comprising:
   a) a bracket including a bracket body attached to said upper frame element;
   b) a pair of spaced-apart, upwardly-directed bracket ends in spaced-apart arrangement, each said end forming an aperture therethrough;
   c) a narrow strip of water-resistant metal banded about the exterior of said lower end of said elongated tubular substrate forming a pair of spaced-apart apertures therethrough and through said tubular substrate in alignment with said bracket end apertures; and,
   d) a water-resistant metal dowel passing through said apertures in said banding, said tubular substrate and said bracket end apertures and having a series of threads formed in the exterior surface thereof for receipt thereover of nut means.

11. The apparatus of claim 8 wherein said apertures are formed in an angled alignment to the end of said tubular substrate to allow said substrate to be mounted in said bracket at an angle to the vertical.

12. The apparatus of claim 1 wherein said top hat comprises six short tubes attached in end-to-end fashion in a hexagonal pattern wherein each upwardly directed elongated tubular substrate is attached to the junction between two said short tubes to hold said six upwardly directed elongated tubular substrates in a hexagonal pattern.

13. A deep ocean, mid-water fanning apparatus, for propagating kelp, comprising:
   a) at least one air-containing tank mounted in a frame and including a lower frame element and an upper frame element;
   b) means for anchoring said at least one tank in deep water and including connection means to connect said anchor means to said lower frame element for holding said device in deep water;
   c) at least one cross arm attached to said upper frame element, extending outward from said at least one tank and having a plurality of kelp-growing substrates anchored thereon in spaced-apart arrangement for receipt thereon of a kelp plant.

14. The apparatus of claim 11 wherein said air-containing tank is a large plastic drum arranged concentrically in said frame.

15. The apparatus of claim 11 wherein said air-containing tank is a large plastic 55-gallon drum arranged concentrically in said frame and said lower frame element is set below said tank said upper frame element is set above said tank, and said frame elements are joined together by cables connected therebetween.

16. The apparatus of claim 11 wherein said means for anchoring said tank in deep water includes a heavy weight and said connection means is a high strength synthetic plastic rope.

17. The apparatus of claim 11 wherein said cross-arm extends orthogonal to said anchor connecting means and includes Schedule 40, stainless steel 2½ inch nominal diameter pipe.

18. The apparatus of claim 11 including two said cross-arms, each arranged orthogonal to each other in planar alignment and orthogonal to said anchor connecting means.

* * * * *

UNITED STATES PATENT AND TRADEMARK OFFICE
CERTIFICATE OF CORRECTION

PATENT NO. : 6,230,646 B1
DATED : May 15, 2001
INVENTOR(S) : Berry et al.

Page 1 of 1

It is certified that error appears in the above-identified patent and that said Letters Patent is hereby corrected as shown below:

Column 1,
Line 50, change "fanning" to -- farming --

Column 4,
Line 35, change "cross-arn" to -- cross-arm --

Column 6,
Line 27, change "fanning" to -- farming --

Signed and Sealed this

Twenty-sixth Day of March, 2002

Attest:

JAMES E. ROGAN
*Attesting Officer*     *Director of the United States Patent and Trademark Office*